(12) United States Patent  
Yeh et al.

(10) Patent No.: US 8,401,792 B2
(45) Date of Patent: Mar. 19, 2013

(54) NAVIGATION SYSTEM AND CONTROL METHOD THEREOF

(75) Inventors: Joe Tsung-Ying Yeh, Saratoga, CA (US); Theresa I-Hsing Yeh, Saratoga, CA (US); Kun-Ming Tsai, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 620 days.

(21) Appl. No.: 12/591,513

(22) Filed: Nov. 23, 2009

(65) Prior Publication Data

US 2010/0131188 A1    May 27, 2010

(30) Foreign Application Priority Data

Nov. 25, 2008  (TW) ................................ 97145438 A

(51) Int. Cl.
*G01C 21/00*    (2006.01)
(52) U.S. Cl. ........ 701/540; 701/400; 701/425; 701/426; 701/430; 701/438; 701/454; 701/461; 701/487; 701/538
(58) Field of Classification Search ................... 701/400, 701/408, 409, 418, 425, 487, 491, 526, 538, 701/541; 345/173–183; 340/407.1–407.2; 178/18.01–20.04
See application file for complete search history.

(56) References Cited

U.S. PATENT DOCUMENTS

| 2004/0204822 A1* | 10/2004 | Kohno et al. ................. 701/200 |
| 2007/0182718 A1* | 8/2007 | Schoener et al. ............. 345/173 |
| 2008/0143686 A1* | 6/2008 | Yeh et al. ...................... 345/173 |
| 2008/0210474 A1* | 9/2008 | Lai et al. ...................... 178/18.03 |
| 2009/0284482 A1* | 11/2009 | Chin ............................ 345/173 |
| 2010/0179991 A1* | 7/2010 | Lorch et al. .................. 709/206 |

FOREIGN PATENT DOCUMENTS

| JP | 11105646 A  *  4/1999 |
| JP | 2004325322 A  *  11/2004 |

OTHER PUBLICATIONS

English translation of JP 2004325322A.*

* cited by examiner

*Primary Examiner* — Thomas Tarcza
*Assistant Examiner* — Rami Khatib
(74) *Attorney, Agent, or Firm* — Rosenberg, Klein & Lee

(57) ABSTRACT

A navigation system includes a touch screen for receiving a touch input and displaying a navigation map, mode-switching means for issuing a mode-switching command to switch the navigation system into an input mode, a memory for storing a database, and a controller to recognize a handwriting input or a gesture input to acquire an input information, search the database for a facility information corresponding to the input information, and show facilities represented by the facility information in the navigation map.

24 Claims, 7 Drawing Sheets

NAVIGATION SYSTEM AND CONTROL METHOD THEREOF

FIELD OF THE INVENTION

The present invention is related generally to navigation systems and, more particularly, to a navigation system having a touch screen.

BACKGROUND OF THE INVENTION

It is known that a navigation system serves to provide position data saved in map database and promptly suggests navigational routes according to users' needs. The modern navigation systems can even be integrated into personal portable electronic tools, such as mobile phones, PDAs and so on.

Before beginning a trip for business or tourism, a user may input to a navigation system his/her destination and particular preferences for navigational route planning, such as preferences for absence of tollways or for the shortest path so that the navigation system plans a navigational route according to the request. Then the user just needs to follow the directions shown in the navigation map and voice prompts and he/she can be led to the destination through the planned route without going astray. However, in practice, during a drive many impromptu demands may be raised, such as demands for refueling or for foods or toilets, and the existing navigation systems seem imperfect in satisfying the impromptu demands during navigation.

Besides, some of the existing navigation systems rely on remote controls for operation, and thus furnish their users with only multi-level menus that are inconvenient to use and really not user-friendly. For example, FIG. 1 is a flowchart showing the operation of a conventional navigation system, which begins, as block 101, in the navigation mode of the navigation system, and the display of the navigation system displays a navigation map. When the user intends to locate a nearby gas station, he/she has to switch the navigation system into another mode to call out a main menu, as block 102, to reset the preset navigational route. Then, by a selection on the main menu, the user goes into a category menu, as block 103, to designate the category of the target facility, i.e. a gas station. Afterward, the navigation system displays a target submenu, as block 104, to provide the user with a list of nearby gas stations, typically in the order from near to far. At this time, by selecting one of the listed gas stations he/she intends to visit, the user can perform target selection, as block 105. Accordingly, the navigation system, after re-planning the navigation map, returns to the navigation mode to display the navigation map for providing the re-planned navigational route, as block 106, to direct the user to the selected gas station. This operation is complicated and time-consuming for a driver to conduct during his/her driving. Thus, if the user is just the driver himself/herself, he/she must stop the vehicle in order to conduct the operation to avoid dangerous driving. Moreover, while the conventional navigation system merely informs the user of nearby target facilities by means of a list of nearby target facilities, it is hard for the user to recognize the geographic relation between each of the target facilities in the list and the current navigational route, thus adding difficulty to the user's selection.

Although there are some other existing navigation systems using touch screens as an input interface that allows users to directly operate the touch screens and thus quickens the operation of the navigation systems, they implement the same operational steps as those depicted in FIG. 1, by which complicated setting has to be inputted through a multi-level menu.

To provide a user-friendly interface, some existing navigation systems allow users to preset exhibition of some particular categories of facilities. For instance, as shown in FIG. 2, if a user presets the navigation system to show nearby gas stations, those gas stations within a predetermined range away from the user's current location 22 can be labeled in the navigation map 20. However, such interface still fails to satisfy users' impromptu needs because it only provides a small amount of facilities located within a short distance and its operation still relies on the aforementioned multi-level menu.

SUMMARY OF THE INVENTION

An object of the present invention is to provide a navigation system.

Another object of the present invention is to provide a control method for a navigation system.

According to the present invention, a navigation system provides a touch screen for receiving a touch input and displaying a navigation map, mode-switching means for issuing a mode-switching command to switch the navigation system into a handwriting input mode, a memory for storing a database, and a controller connected the touch screen and memory to search the database according to a handwriting input. After the navigation system is switched into the handwriting input mode, the controller may acquire an input information by recognize a handwriting input conducted on the touch screen, and accordingly searches the database for a facility information corresponding to the input information, and then shows facilities represented by the facility information in the navigation map.

According to the present invention, a navigation system provides a touch screen for receiving a touch input and displaying a navigation map, mode-switching means for issuing a mode-switching command to switch the navigation system into a gesture input mode, a memory for storing a database, and a controller connected the touch screen and memory to search the database according to a gesture input. After the navigation system is switched into the gesture input mode, the controller may acquire an input information by recognize a gesture input conducted on the touch screen, and accordingly searches the database for a facility information corresponding to the input information, and then shows facilities represented by the facility information in the navigation map.

Preferably, the controller compares the input information with a list to determine a category of the facility information corresponding to the input information.

Preferably, the mode-switching means comprises a graphical or physical button or a preset gesture.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE PREFERRED EMBODIMENTS

Figure 1:
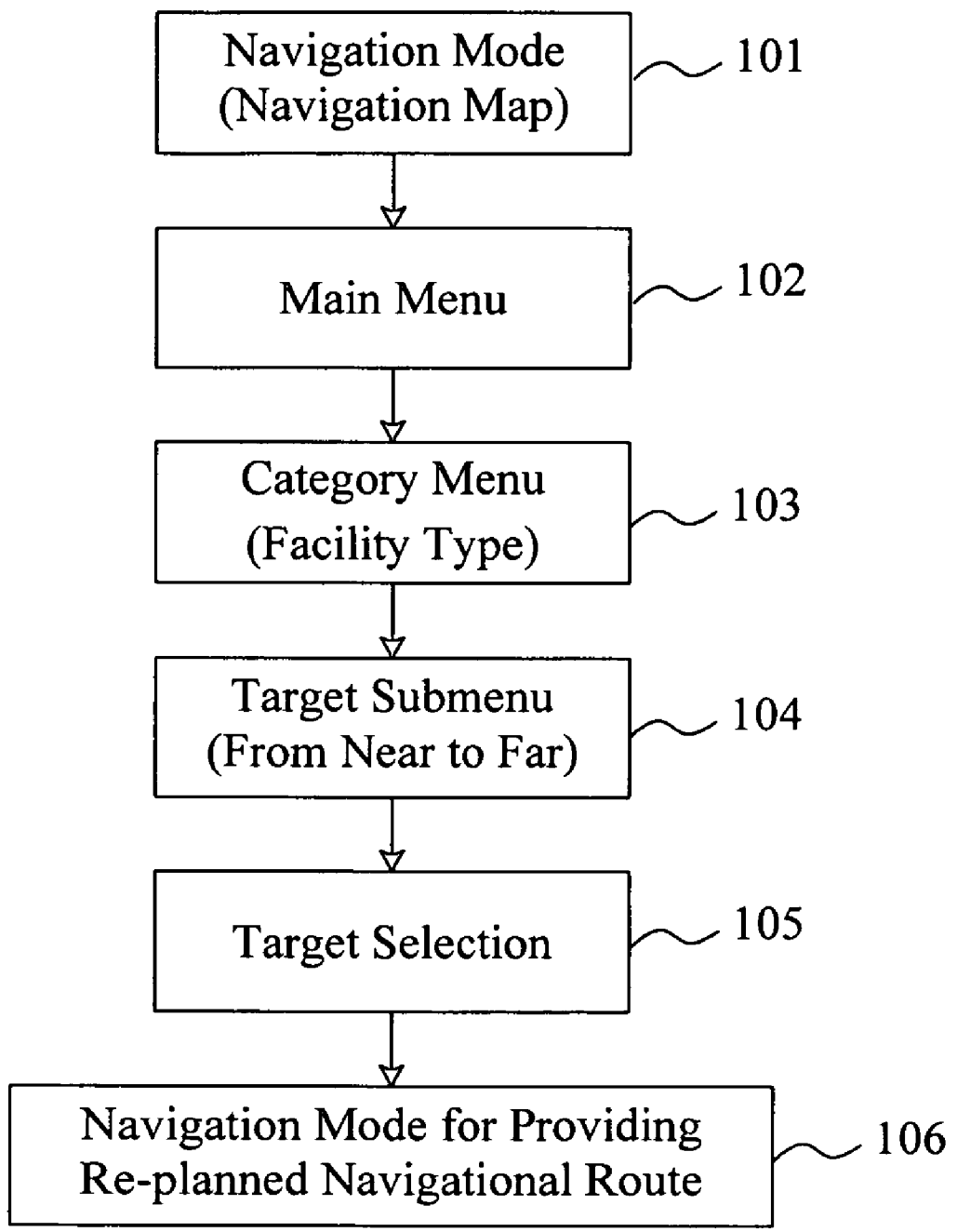
FIG. 1 is a flowchart showing the operation of a conventional navigation system.
Figure 2:
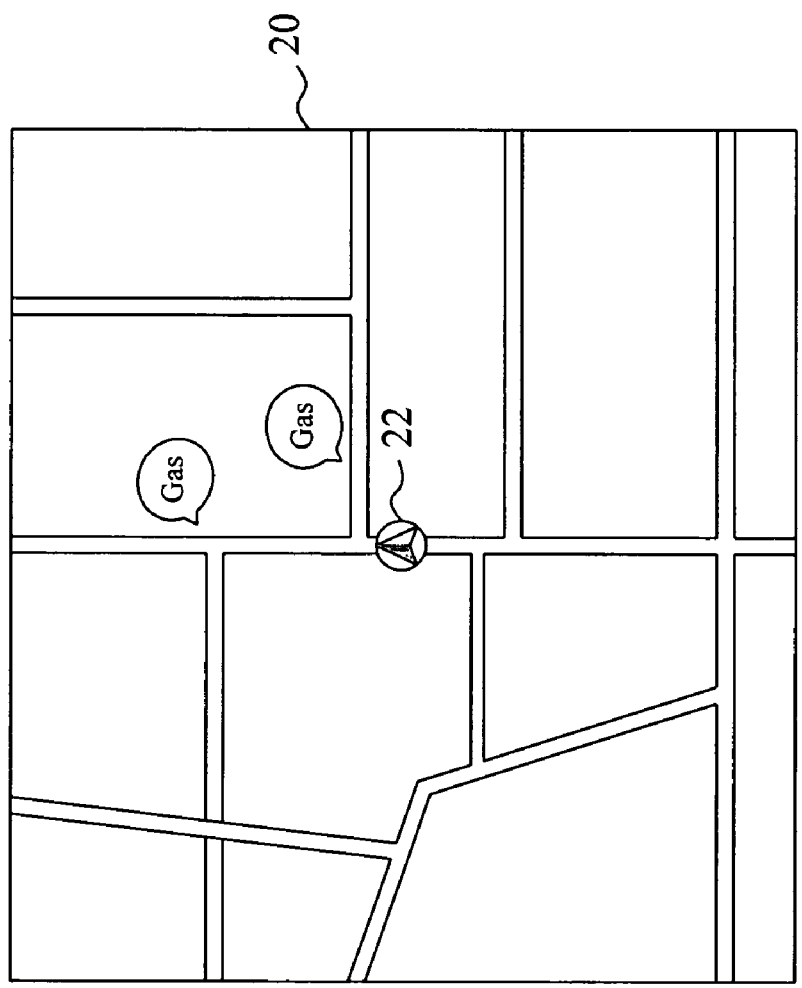
FIG. 2 is a schematic diagram showing a navigation map of a conventional navigation system.
Figure 3:
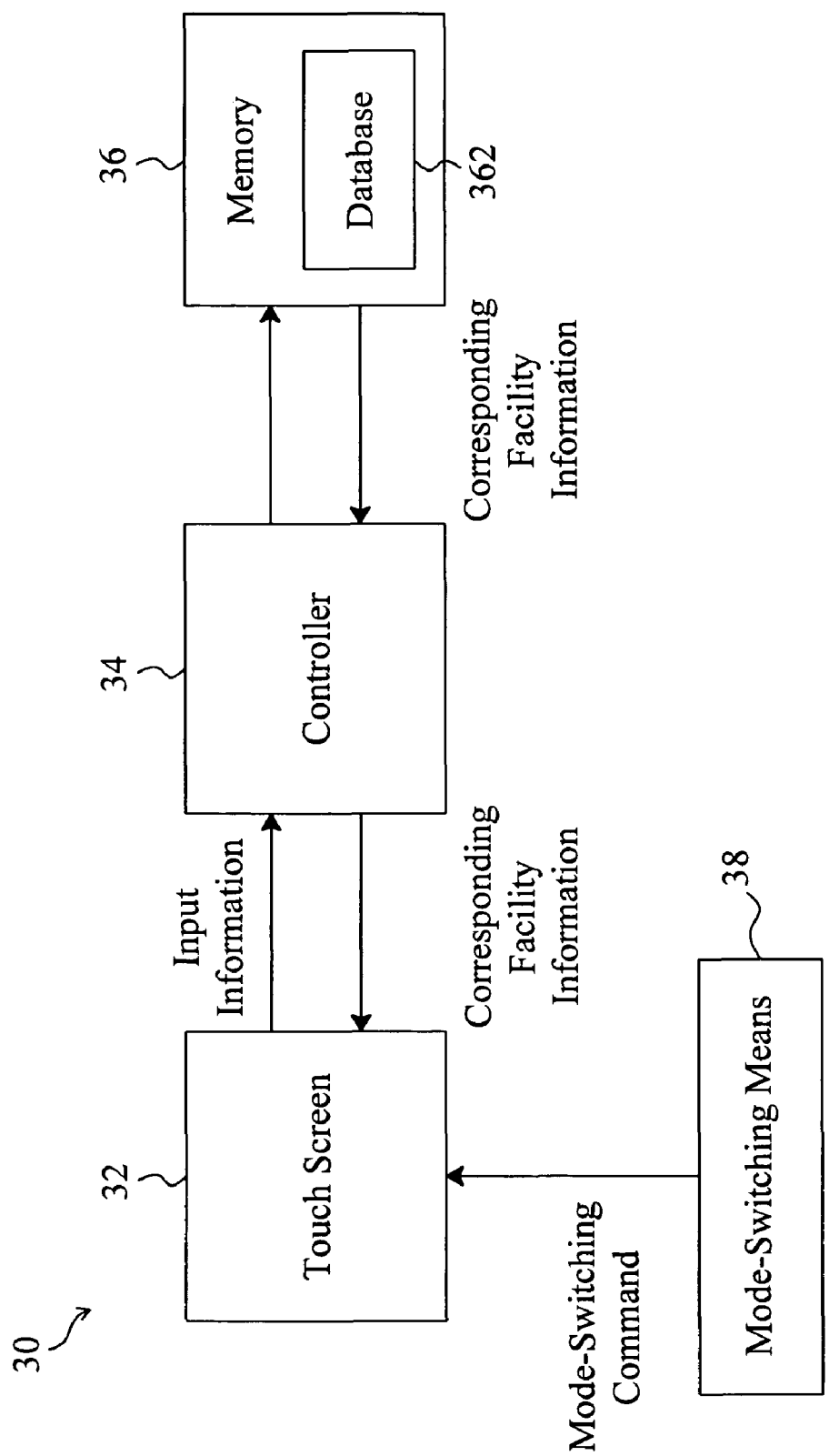
FIG. 3 is a block diagram of a navigation system in an embodiment according to the present invention.
Figure 4:
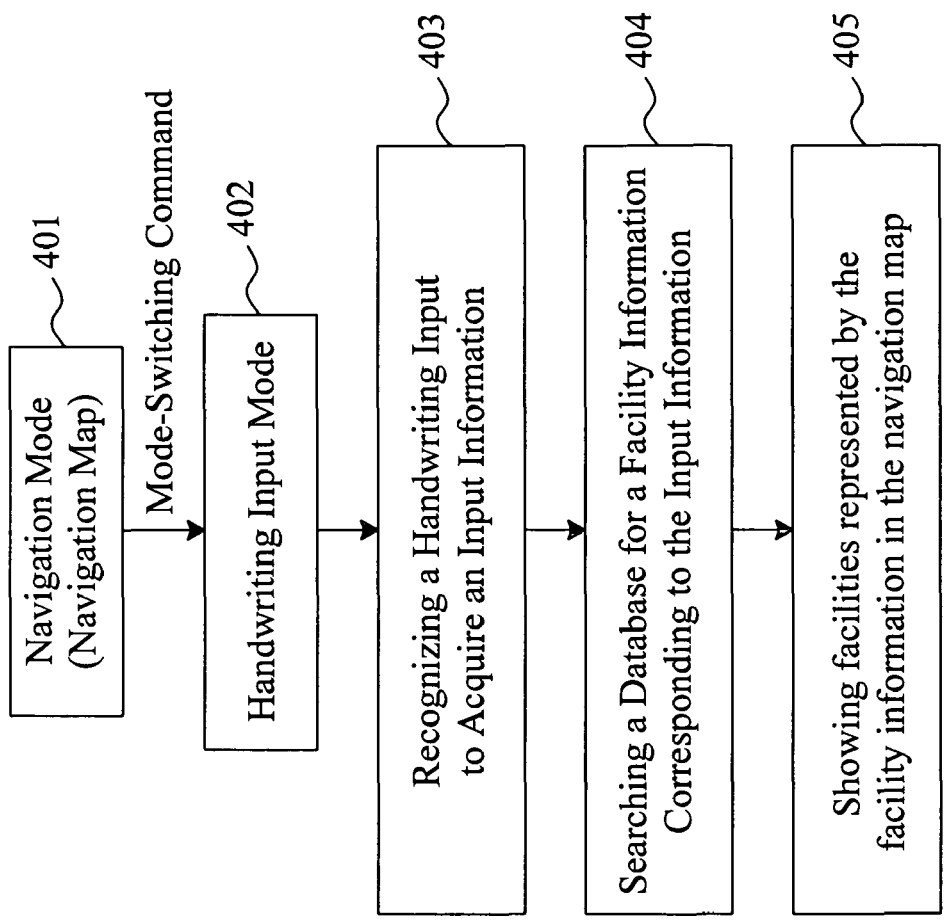
FIG. 4 is a flowchart of a control method for the navigation system of FIG. 3.

As shown in FIG. 3, a navigation system 30 according to the present invention includes a touch screen 32 acting as both a display and an input interface, a controller 34 connected to the touch screen 32, a memory 36 for storing a database 362, and mode-switching means 38 for issuing a mode-switching command to switch the navigation system 30 into an input mode. The mode-switching means 38 may be a virtual graphical button displayed on the touch screen 32, a physical button, or a particular user gesture, such as a user's multi-finger touch on the touch screen 32. The controller 34 may receive a user input from the touch screen 32 and accesses the database 362 stored in the memory 36 according to the user input. FIG. 4 is a flowchart of a control method for the navigation system 30 of FIG. 3, which begins, as block 401, in the navigation mode of the navigation system 30, and the touch screen 32 displays a navigation map. Responsive to a mode-switching command, the navigation system 30 is switched into a handwriting input mode, as block 402, in which the user may conduct a handwriting input on the touch screen 32. At step 403, the controller 34 will recognize the handwriting input on the touch screen 32 to acquire an input information therefrom. Afterward, at step 404, the controller 34 searches the database 362 for a facility information corresponding to the input information, and then, at step 405, shows the facilities represented by the facility information in the navigation map on the touch screen 32.

Figure 5:
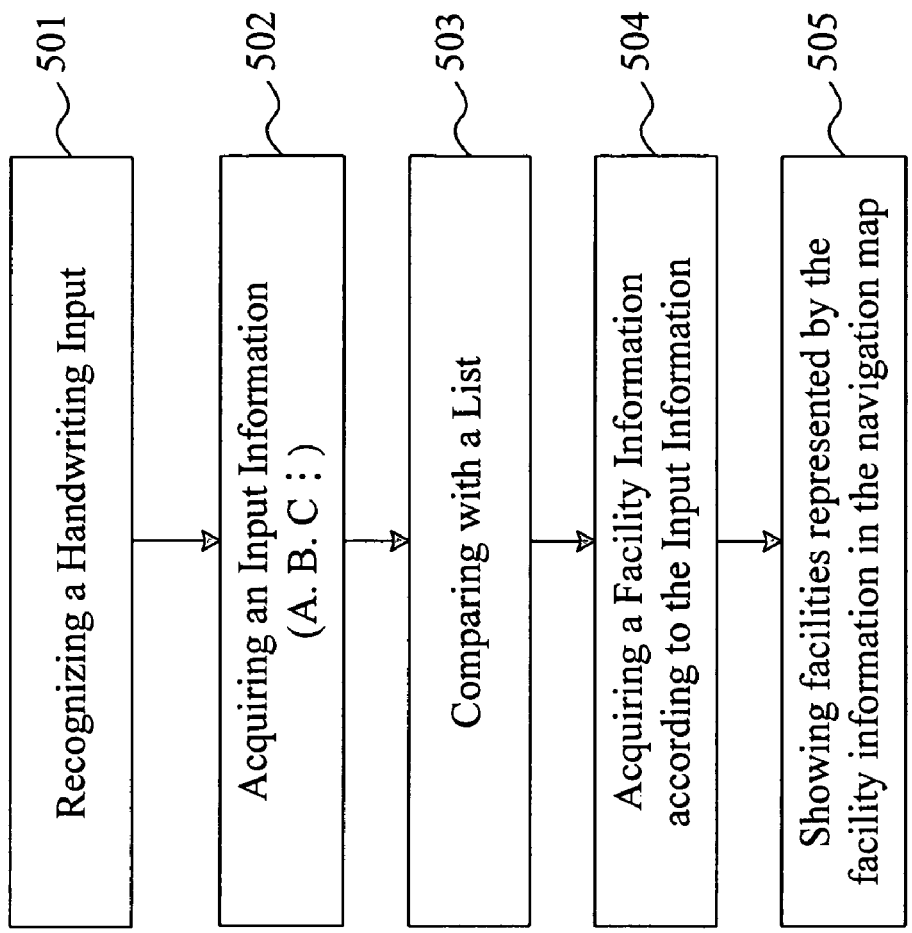
FIG. 5 is a flowchart of acquiring a facility information from a preset list.

This embodiment may use a preset list. Referring to FIG. 5, by recognizing a user's handwriting input at step 501, the controller 34 acquires an input information at step 502, for example, letters, A, B, C, . . . , or other particular symbols. The controller 34 compares the input information with a preset list at step 503 and according therewith, acquires a facility information at step 504, and then, at step 505, shows the facilities in the navigation map.

The content of the preset list may be defined by a user instead of being default set by the system designer of the navigation system 30. Preferably, in addition to the locations of the target facilities, additional information about the facilities or a submenu related to the facilities is also provided so that a user can use the Internet or phone system equipped to the vehicle to visit the websites of the facilities or call to the facilities. Table 1 provides an example of the preset list. For example, referring to Table 1 and

TABLE 1

| Input Letter | Corresponding Command | Response |
| --- | --- | --- |
| A | Airport | Showing airport location, flight information and arrival and departure schedule |
| B | Beach | Showing beach location, temperatures and parking information |
| C | Cinema | Showing cinema locations and film lineup |
| D | Department Store | Showing department store locations and types |
| E | User-Defined | User-defined |
| F | User-Defined | User-defined |
| G | Gas | Showing gas station locations and fuel prices |
| H | Hospital | Calling a preset hospital (Emergency) |

TABLE 1-continued

| Input Letter | Corresponding Command | Response |
| --- | --- | --- |
| I | User-Defined | User-defined |
| J | Jeweler | Showing jewelry stores |
| K | User-Defined | User-defined |
| L | Library | Showing library location, related information |
| M | Mall | Showing mall location, store information |
| N | User-Defined | User-defined |
| O | User-Defined | User-defined |
| P | Police | Showing police stations |
| Q | User-Defined | User-Defined |
| R | Restaurant | Showing submenus of, for example, different cuisine types (including Japanese cuisine, Chinese cuisine, Korean cuisine, Italian cuisine, American cuisine, etc.) and reservation information |
| S | Supermarket | Showing supermarket locations and sale information |
| T | Train Station | Showing train station information and train schedule |
| U | University | Showing university locations, office hours and admission information |
| V | Previous Page | Returning to a previous page |
| W | Work | Showing a preset workplace |
| X | Homepage | Returning to homepage |
| Y | Yoghurt | Showing yoghurt shop locations and product information |
| Z | Zoo | Showing Zoo locations and related information |
| $ | ATM | Showing ATM locations |

Figure 6:
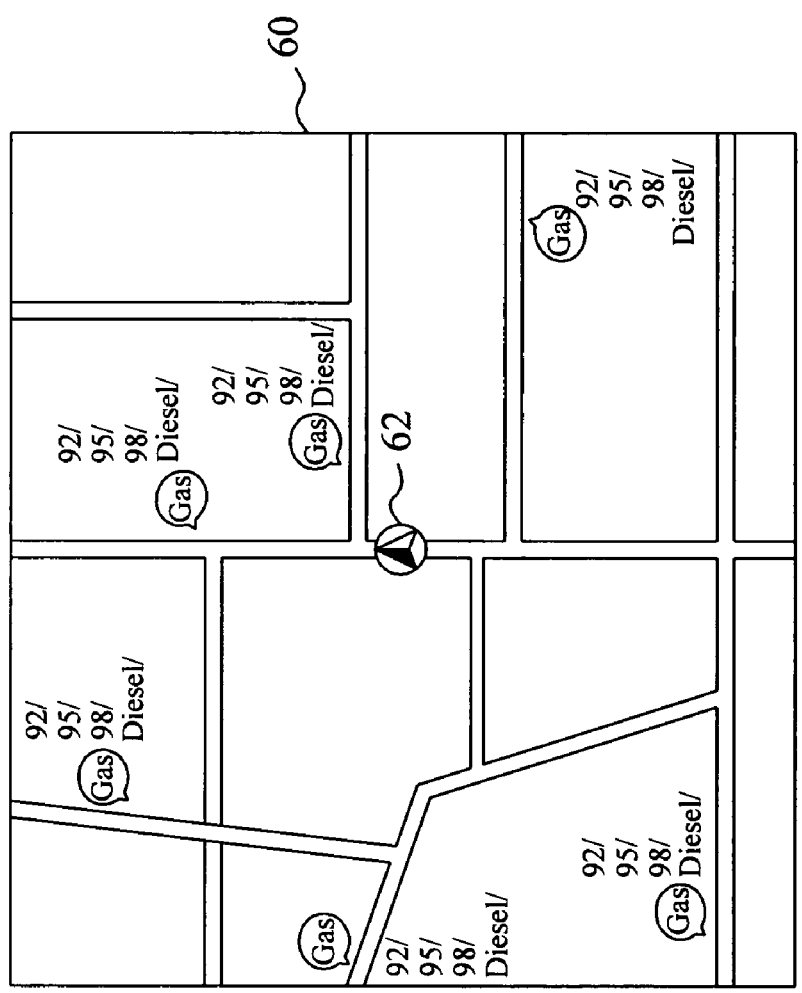
FIG. 6 is a navigation map after the process of FIG. 5.

FIG. 6, when it is recognized a letter G from the user's handwriting input, the controller 34 acquires the information of all nearby gas stations from the database 362, and then, taking the current location 62 as a center, shows all the nearby gas stations in the navigation map 60 as small icons and provides the current gas prices of all kinds of fuels available in the gas station, such as unleaded gasoline 92, unleaded gasoline 95, unleaded gasoline 98 and diesel fuel.

Figure 7:
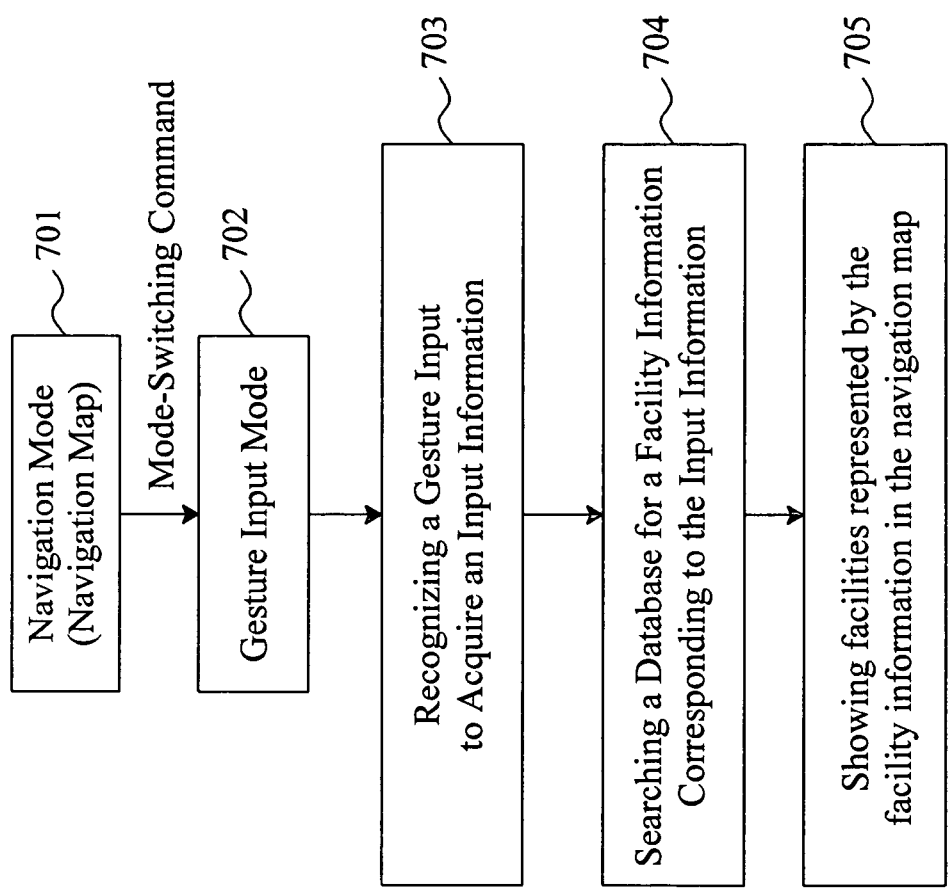
FIG. 7 is a flowchart of another control method for the navigation system of FIG. 3.

FIG. 7 is a flowchart of another control method for the navigation system 30 of FIG. 3. Referring to FIGS. 3, 6 and 7, currently, as shown by block 701, the navigation system 30 is in the navigation mode and the touch screen 32 displays a navigation map 60. Responsive to a mode-switching command, the navigation system 30 is switched from the navigation mode into a gesture input mode, as block 702. In the gesture input mode, the controller 34 reorganizes a gesture input conducted on the touch screen 32 to acquire an input information at step 703, and searches the database 362 for a facility information corresponding to the input information at step 704. Then, at step 705, the controller 34 shows the facilities represented by the facility information in the navigation map 60. In this embodiment, the categories of facilities corresponding to the gestures can be defined by the user. For example, the user may set a circling gesture to refer to parking lots, a checking gesture to refer to restaurants, and a crossing gesture to refer to gas stations, so that the user can promptly acquire the information about nearby facilities by a simple gesture.

According to the present invention, the control methods for the navigation system 30 fully employs the advantages of touch operation, thereby minimizing the procedures of operation, improving operational convenience, and reducing driving danger caused by operating a complicated navigation system.

In an embodiment, the navigation map 60 is still displayed on the touch screen 32 during operation of gesture inputs or handwriting inputs.

In a modified embodiment, when sensing that a user is touching an icon representing some facility, the navigation system 30 provides an option of "guide to this place" or exhibiting detailed information of the facility, e.g. a telephone number, an URL or other contacting information, so that the user can use an Internet system or a phone system equipped to the vehicle to contact the selected facility by making a phone call or visiting a homepage of the facility. The aforesaid operation of making a phone call or visiting the homepage of the facility may also be realized by the handwriting input or gesture input on the touch screen 32. For example, in the scene showing the detailed information of the facility, the user may input a letter "T" in a handwriting manner so as to make the navigation system 30 automatically dial the facility.

In another modified embodiment, Chinese handwriting input is acceptable to the navigation system 30 for information search. The list shown in Table 1 can be replaced with a multi-level menu. Taking a letter "R" representing restaurants as an example, it may selectively actuate submenus of Japanese cuisine, Chinese cuisine, Korean cuisine, Italian cuisine, American cuisine and so on. When the user touches one of the categories, the navigation system 30 provides information of a plurality of restaurants available in that category. For instance, the submenu of the letter "A" representing airports may provide flight information and arrival and departure schedules for the user's reference.

Multi-finger touch gestures may be also applied to the present invention. For example, the gesture of bringing two fingers close or separating two fingers apart can zoom in or zoom out the navigation map; or, the gesture of rotating or twisting two fingers can cause the navigation map to rotate.

The touch screen 32 may be implemented with a capacitive touch panel, a resistive touch panel, an ultrasonic touch panel, or an infrared touch panel.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A navigation system, comprising:
   a controller;
   a touch screen coupled to the controller, for receiving a touch input and displaying a navigation map in a first mode;
   a memory device coupled to the controller, for storing a database containing a user reconfigurable set of symbols; and
   mode-switching mechanism for issuing a mode-switching command to selectively switch the navigation system from the first mode into a second mode defining a handwriting input mode;
   wherein the controller acquires input information by recognizing a handwriting input conducted on the touch screen corresponding with at least one of said reconfigurable set of symbols in the handwriting input mode, and searches the database responsive to a selective input symbol handwritten on said touch screen for a facility information corresponding to the input information, and displays facilities represented by the facility information in the navigation map in the first mode.

2. The navigation system of claim 1, wherein the mode-switching mechanism comprises a virtual graphical button displayed on the touch screen, for receiving a touch to issue the mode-switching command.

3. The navigation system of claim 1, wherein the mode-switching mechanism comprises a gesture pre-defined to issue the mode-switching command.

4. The navigation system of claim 3, wherein the gesture comprises a multi-finger touch.

5. The navigation system of claim 1, wherein the controller compares the input information with a list to determine a category of the facilities corresponding to the input information.

6. The navigation system of claim 1, wherein the touch screen comprises a capacitive touch panel.

7. The navigation system of claim 1, wherein the touch screen comprises a resistive touch panel.

8. The navigation system of claim 1, wherein the touch screen comprises an ultrasonic touch panel.

9. The navigation system of claim 1, wherein the touch screen comprises an infrared touch panel.

10. A navigation system, comprising:
    a controller;
    a touch screen coupled to the controller, for receiving a touch input and displaying a navigation map in a first mode;
    a memory device coupled to the controller, for storing a database; and
    mode-switching mechanism for issuing a mode-switching command to selectively switch the navigation system from the first mode into a second mode defining a gesture input mode;
    wherein the controller acquires input information by recognizing a gesture input conducted on the touch screen corresponding with at least one of said reconfigurable set of symbols in the gesture input mode, and searches the database responsive to a selective input symbol on said touch screen for a facility information corresponding to the input information, and displays facilities represented by the facility information in the navigation map in the first mode.

11. The navigation system of claim 10, wherein the mode-switching mechanism comprises a virtual graphical button displayed on the touch screen, for receiving a touch to issue the mode-switching command.

12. The navigation system of claim 10, wherein the mode-switching mechanism comprises a gesture pre-defined to issue the mode-switching command.

13. The navigation system of claim 12, wherein the gesture comprises a multi-finger touch.

14. The navigation system of claim 10, wherein the controller compares the input information with a list to determine a category of the facilities corresponding to the input information.

15. The navigation system of claim 10, wherein the touch screen comprises a capacitive touch panel.

16. The navigation system of claim 10, wherein the touch screen comprises a resistive touch panel.

17. The navigation system of claim 10, wherein the touch screen comprises an ultrasonic touch panel.

18. The navigation system of claim 10, wherein the touch screen comprises an infrared touch panel.

19. A control method for a navigation system including a touch screen for receiving a touch input and displaying a navigation map, the control method comprising the steps of:
    responsive to a mode-switching command, switching the navigation system from a first mode into a second mode defining a handwriting input mode;
    in the handwriting input mode, recognizing a handwriting input conducted on the touch screen to acquire an input information;

searching a database containing a user reconfigurable set of symbols for a facility information corresponding with at least one of said reconfigurable set of symbols to the input information; and showing facilities represented by the facility information in a navigation map in the first mode.

20. The control method of claim 19, further comprising the step of comparing the input information with a list to determine a category of the facilities corresponding to the input information.

21. The control method of claim 19, further comprising the steps of:

indicating locations of the facilities in the navigation map; and prompting related information of the facilities on the touch screen.

22. A control method for a navigation system including a touch screen for receiving a touch input and displaying a navigation map, the control method comprising the steps of:

responsive to a mode-switching command, switching the navigation system from a first mode into a second mode defining a gesture input mode;

in the gesture input mode, recognizing a gesture input conducted on the touch screen to acquire an input information;

searching a database containing a user reconfigurable set of symbols for a facility information corresponding with at least one of said reconfigurable set of symbols to the input information; and showing facilities represented by the facility information in the navigation map in the first mode.

23. The control method of claim 22, further comprising the step of comparing the input information with a list to determine a category of the facilities corresponding to the input information.

24. The control method of claim 22, further comprising the steps of:

indicating locations of the facilities in the navigation map; and prompting related information of the facilities on the touch screen.

* * * * *